United States Patent [19]
Sebald et al.

[11] Patent Number: 5,683,224
[45] Date of Patent: Nov. 4, 1997

[54] ROTOR MOUNTING OF AN EXHAUST TURBOCHARGER

[75] Inventors: Wilhelm Sebald, Veitshöchheim; Gerhard Kreiselmeier, Dittelbrunn, both of Germany

[73] Assignee: FAG Aircraft/Super Precision Bearing GmbH, Germany

[21] Appl. No.: 724,439

[22] Filed: Oct. 1, 1996

[30] Foreign Application Priority Data

Oct. 17, 1995 [DE] Germany .................... 195 38 553.3

[51] Int. Cl.[6] ............................................. F04D 29/08
[52] U.S. Cl. .................................. 415/111; 384/475
[58] Field of Search ........................... 415/110, 111; 384/474, 475

[56] References Cited

U.S. PATENT DOCUMENTS

| | | | |
|---|---|---|---|
| 1,642,979 | 9/1927 | Timbs et al. | 384/475 |
| 3,090,544 | 5/1963 | Woollenweber et al. | 415/111 |
| 4,824,264 | 4/1989 | Hoebel | 384/475 |
| 4,988,218 | 1/1991 | Quaglia | 384/475 |
| 5,106,209 | 4/1992 | Atkinson et al. | 384/475 |
| 5,248,245 | 9/1993 | Behnke et al. | 415/110 |
| 5,399,027 | 3/1995 | Ijuin et al. | 384/475 |

FOREIGN PATENT DOCUMENTS

| | | |
|---|---|---|
| 0143950 | 12/1985 | European Pat. Off. . |
| 0504138 | 9/1992 | European Pat. Off. . |

*Primary Examiner*—John T. Kwon
*Attorney, Agent, or Firm*—Ostrolenk, Faber, Gerb & Soffen, LLP

[57] ABSTRACT

The invention enables reliable feeding of lubricant for the rotor mounting of an exhaust turbocharger, wherein the rotary shaft is supported in a two row antifriction bearing, so that the lubricant is uniformly distributed to each of the rows of rolling bodies although the lubricant is supplied from one axial side of the bearing. The bearing inner ring is separated into two rings. A first inner ring is below and defines the inner race for one row of rolling bodies. Below the other row of rolling bodies is a second inner race comprised of two inner ring parts. The inner ring for the first row of rolling bodies extends radially inwardly and axially past the second inner ring parts for the second row of rolling bodies. An annular channel in the axially inner, first ring part of the second inner ring is connected with an axially extending passage that transmits lubricant to the annular channel. Respective lubricant transmission channels from the annular channel communicate with the axially opposite sides of the first inner ring part. These sides are respectively at the first and second rows of rolling bodies. This uniformly delivers lubricant to each of the inner races at each of the rows of rolling bodies. The quantities of axial passages and of lubricant transmission channels differ and are adapted to each other to provide a uniform lubricant flow to each of the rows of rolling bodies.

15 Claims, 2 Drawing Sheets

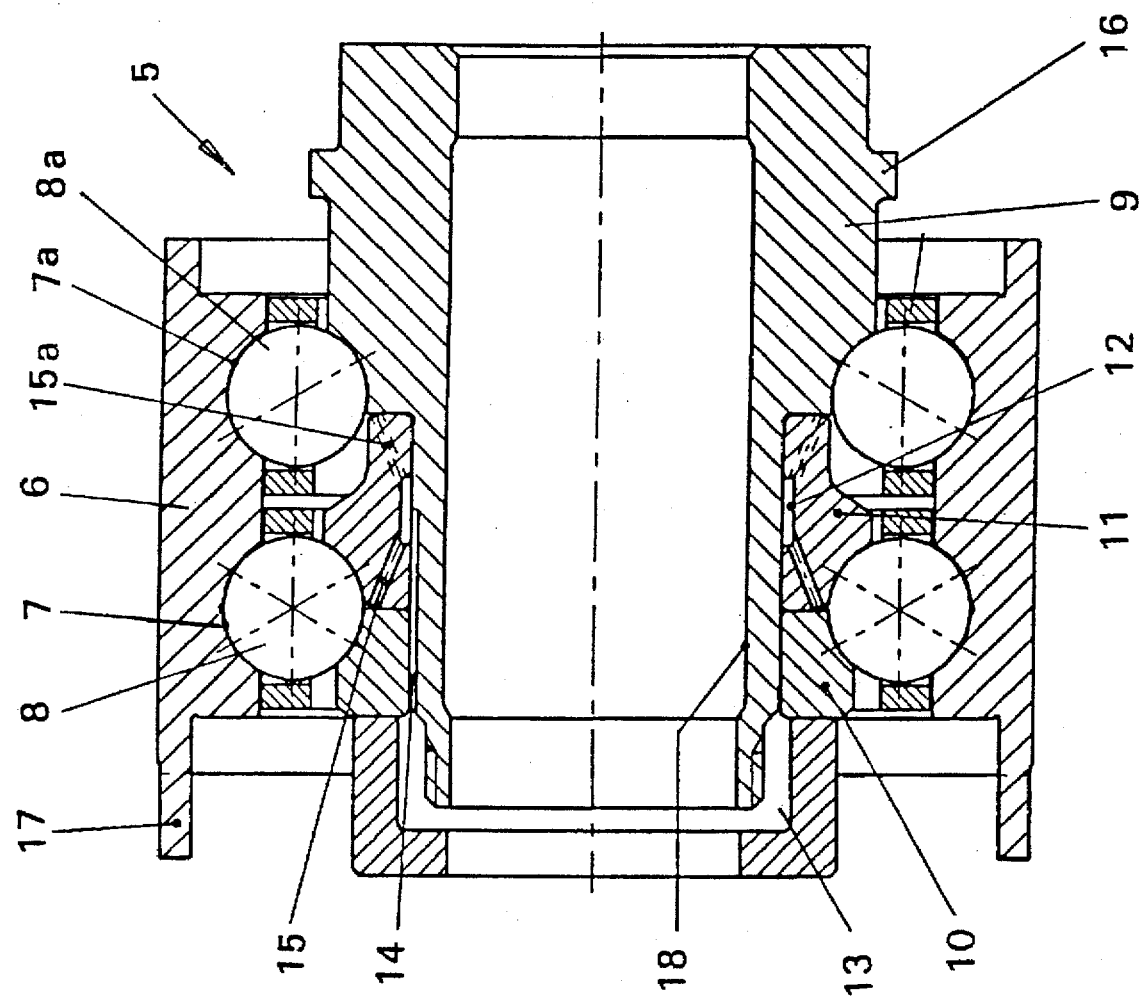

ROTOR MOUNTING OF AN EXHAUST TURBOCHARGER

BACKGROUND OF THE INVENTION

The invention relates to a rotor mounting of an exhaust turbocharger and particularly to the delivery of lubricant to the bearings for the turbocharger.

EP 0 143 950 B1 discloses supporting the rotor of an exhaust turbo supercharger at a mounting place using two angular ball bearings arranged in tandem. Each antifriction bearing used in this connection, as is customary, includes an inner ring, an outer ring, and rolling bodies arranged between the rings. Each outer ring is firmly seated in a separate bearing holding ring. Such a mounting is cumbersome, expensive and difficult to maintain because it has many individual parts. It is difficult to supply the two rows of antifriction bearings uniformly with lubricant particularly when the lubricant can be fed to the bearing from only one axial side.

SUMMARY OF THE INVENTION

The object of the invention is to so develop a rotor mounting of a turbocharger that, while it is of simple construction and its bearing is inexpensively developed, it permits a uniform, reliable supply of lubricant to the two rows of antifriction bearings within the same installation space and further provides dependable, user friendly maintenance.

The invention enables reliable feeding of lubricant for the rotor mounting of an exhaust turbocharger, wherein the rotary shaft is supported in a two row antifriction bearing, so that the lubricant is uniformly distributed to each of the rows of rolling bodies although the lubricant is supplied from one axial side of the bearing. The inner race for rolling bodies is separated into two rings. The first ring is below and define the inner race for one row of rolling bodies. Below the other row of rolling bodies is a second inner race comprised of two inner ring parts. The first inner ring for the first row of rolling bodies extends radially inwardly and axially past the second inner ring parts for the second inner race roll. There is an annular channel in the axially inner second inner ring part, which is the part of the second inner ring that is axially closer to the first inner ring. That annular channel is connected with an axially extending passage that transmits lubricant to the annular channel. Respective lubricant transmission channels from the annular channel communicate with the axially opposite sides of that second inner ring part. These sides are respectively at the first and second rows of rolling bodies. This uniformly delivers lubricant to each of the inner races at each of the rows of rolling bodies. The quantities of the axially extending passages and of lubricant transmission channels differ and are adapted to each other to provide a uniform lubricant flow to each of the rows of rolling bodies.

The integrated development of the bearing rings provides a compact, light weight, reliably handled and inexpensive mounting of the turbocharger which can be reliably provided with lubricant. Integration of an anti-rotation lock in the outer ring and arrangement of an oil slinging extension on one of the inner rings also represent cost favorable measures, which simplify overall construction and increase reliability in operation.

Other objects, features and advantages of the present invention will become apparent from the following description of the invention which refers to the accompanying drawings.

BRIEF DESCRIPTION OF THE DRAWINGS

FIG. 2 shown, on a large scale, a cross section through the mounting and lubricating system of the exhaust turbocharger of FIG. 1.

DETAILED DESCRIPTION OF THE INVENTION

Figure 1:
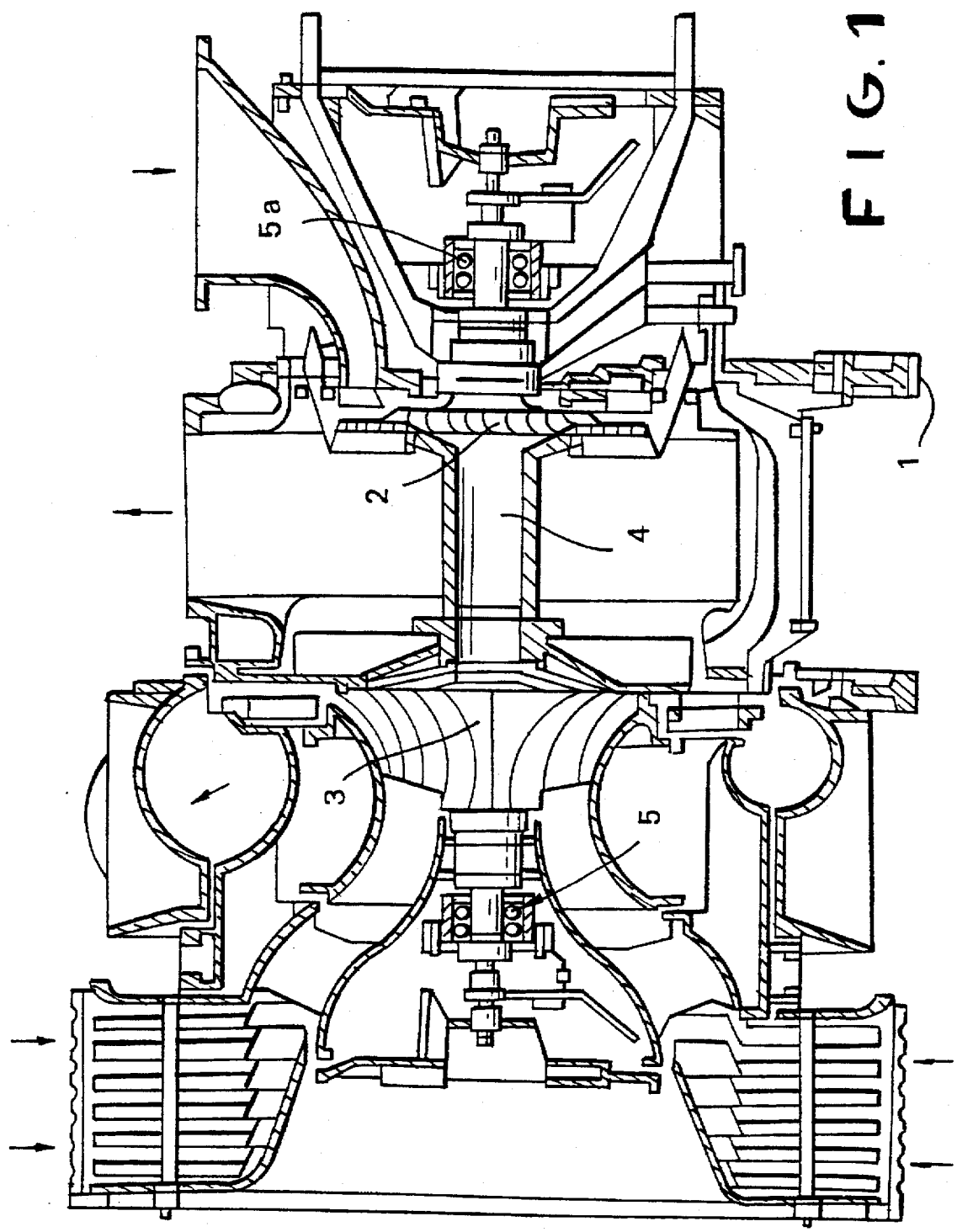
FIG. 1 is a cross section through an exhaust turbocharger of the type for which the mounting of the invention is suitable.

In FIG. 1, the turbocharger housing 1 encloses a turbine wheel 2 and a compressor wheel 3 which are arranged on a shaft 4 which is supported by a bearing system 5 and 5a.

The bearing system 5 is shown in FIG. 2. It includes two outer races 7 for two rows of rolling bodies in the form of rows of balls 8 and 8a. The two outer races are arranged in a one piece bearing outer ring 6. The bearing inner ring is in three parts in FIG. 2, including a first inner ring 9 defining the race for the right hand row 8a and a two part second inner ring having parts 10 and 11 which both define the race for the left hand row 8. The right hand row of balls 8a, together with the first inner ring 9 is developed as an angular ball bearing.

The left hand row of balls with the axially split two inner ring parts 10 and 11 is developed as a four-point bearing. The balls 8 are contacted by both of the inner ring parts 10 and 11. The first inner ring part 10 extends axially from the left or axially away from the first inner ring to about the middle of the row of balls 8. The axial length and placement of the second inner ring part 11 are selected so that its opposite axial sides are each radially below a respective one of the two rows of balls, which enables lubricant from the second ring part 11 to flow to both rows 8 and 8a of balls.

The first inner ring 9 extends axially to the left to be radially inside the four point ball bearing so that the first inner ring 9 supports the inner ring parts 10 and 11 of the second inner ring. This completes channels for lubricant outside the first inner ring 9 and inside the ring parts 10 and 11 of the second inner ring.

For lubricating this bearing, oil is first fed into the annular space 13 located toward one axial side of the bearing. In order to uniformly provide the two races 7, 7a and the rows of balls 8, 8a with lubricant, at least one circumferentially limited, axially extending passage in the form of a groove 14 is provided in the periphery of the inner ring 9. One axial end of the groove 14 is in communication with the annular space 13 and the other axial end communicates with an annular channel 12 formed in the inner periphery of the second inner ring part 11. Several lubricant transmission channels 15, 15a extend from the annular channel 12 to the two axially opposite side surfaces of the inner ring part 11 and these sides are respectively radially inward of the two rows of balls 8 and 8a. The number and spacing of the grooves 14, as well as the spacing of the grooves 14 and the channels 15, 15a may be different from each other and are adapted to each other so that lubricant flow to both rows of balls may be uniform, thereby preventing a preferred flow of lubricant to only one of the rows of balls 8 or 8a.

The inner ring 9 is furthermore provided with an oil slinger extension 16 which throws off excess oil which migrates onto it.

For providing a rotary lock, the outer ring 6 is provided with axially extending protrusions 17. To impart certain resilient properties to the mounting, the bore of the inner ring 9 of the angular ball bearing is recessed at 18 which extends over the axial width of the bearing. The axial ends of that recess define seating surfaces located toward the ends of the bore for centering the rotor shaft.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A rotor mounting for an exhaust turbocharger, wherein the turbocharger includes a rotor shaft, and an antifriction bearing between a stationary part of the turbocharger and the rotor shaft;

the antifriction bearing including two annular, axially separated rows of bearing rolling bodies;

an outer ring having two races each respectively placed for one of the rows of rolling bodies;

a first inner ring radially inward of one of the rows of rolling bodies for defining a first inner race for cooperating with the first outer race for the one roll of rolling bodies;

a second inner ring radially inward of the other row of rolling bodies for defining a second inner race for cooperating with the second outer race for the other row of rolling bodies;

the first inner ring extending radially inward of and axially past and supporting the second inner ring;

a circumferentially extending lubricant transporting channel between the second inner ring and the first inner ring as it passes by the second inner ring;

a passage communicating from axially past one of the inner rings to the circumferentially extending channel;

the second inner ring having axially opposite sides, the first axial side being nearer to the first row of rolling bodies and the second axial end being nearer the second row of rolling bodies;

a first lubricant transmission channel communicating from the circumferential channel to the second inner ring where the first channel outlets at the first row of rolling bodies, a second lubricant transmission channel communicating from the circumferential channel to the second inner ring where the second channel outlets at the second row of rolling bodies, the first and second channels being for delivering lubricant to the respective inner races for the first and second rows of rolling bodies;

the quantity of the passages communicating to the circumferential channel and the quantity of first lubricant transmitting channels and the quantity of second lubricant transmitting channels are all selected so that lubricant is distributed uniformly to each of the first and second rows of rolling bodies in all respective positions of the first and second inner rings.

2. The rotor mounting of claim 1, wherein the bearing outer ring is developed in a single part having the first and second outer races therein.

3. The rotor mounting of claim 1, wherein the lubricant transmission channels pass through the body of the second inner ring to their outlets.

4. The rotor mounting of claim 1, wherein the circumferential channel is an annular channel defined on the inner surface of the second inner ring surrounded by the first inner ring.

5. The rotor mounting of claim 1, wherein the quantity of passages transmitting lubricant axially to the circumferential channel and the number of first and the number of second lubricant transmission channels are different and adapted to each other for uniform distribution of lubricant over the rows of rolling bodies.

6. The rotor mounting of claim 1, wherein the second inner ring comprises first and second inner ring parts defining axially neighboring parts of the inner race for the other row of rolling bodies;

the circumferential channel and the lubricant transmission channels being in the first inner ring part.

7. The rotor mounting of claim 6, wherein the passage extends axially with reference to the rotor mounting from the outside of the bearing past the second inner ring part to the circumferential channel at the first inner ring part.

8. The rotor mounting of claim 6, wherein the first inner ring part has the axially opposite sides, the sides being respectively generally axially at the first and the other rows of rolling bodies, and the lubricant transmission channels outlet at the sides of the first inner ring part.

9. The rotor mounting of claim 8, wherein the first inner ring part is axially nearer to the first row of rolling bodies and the second inner ring part is axially further from the first row of rolling bodies.

10. The rotor mounting of claim 1, wherein the passage extends from out of the bearing and is defined as a groove in the outer surface of the first inner ring which passes inside the second inner ring.

11. The rotor mounting of claim 1, wherein the outer ring has axially extending extensions that define a rotation lock.

12. The rotor mounting of claim 1, wherein the first inner ring has an oil slinger extension.

13. The rotor mounting of claim 1, wherein the first inner ring has an inner bore where it passes beneath the first and second rows of rolling bodies; a recess being defined in the bore extending over the width of the bearing for defining seating surfaces at the ends of that first inner ring for centering a rotor shaft.

14. The rotor mounting of claim 1, wherein the lubricant transmission channels outlet at the opposite sides of the second inner ring.

15. The rotor mounting of claim 14, wherein the opposite sides of the second inner ring are respectively generally axially at the first and the other rows of rolling bodies.

* * * * *